US012730728B2

(12) United States Patent
Mangal et al.

(10) Patent No.: US 12,730,728 B2
(45) Date of Patent: Sep. 8, 2026

(54) SECURELY ERASING DATA ON INOPERATIVE STORAGE DEVICE

(71) Applicant: WESTERN DIGITAL TECHNOLOGIES, INC., San Jose, CA (US)

(72) Inventors: Govind Mangal, Bangalore (IN); Saurabh Singh, Bangalore (IN)

(73) Assignee: SANDISK TECHNOLOGIES, INC, Milpitas, CA (US)

( * ) Notice: Subject to any disclaimer, the term of this patent is extended or adjusted under 35 U.S.C. 154(b) by 41 days.

(21) Appl. No.: 18/233,981

(22) Filed: Aug. 15, 2023

(65) Prior Publication Data

US 2024/0320110 A1 Sep. 26, 2024

Related U.S. Application Data

(60) Provisional application No. 63/454,423, filed on Mar. 24, 2023.

(51) Int. Cl.
*G06F 11/00* (2006.01)
*G06F 11/16* (2006.01)
*G06F 21/64* (2013.01)

(52) U.S. Cl.
CPC .......... *G06F 11/1666* (2013.01); *G06F 21/64* (2013.01)

(58) Field of Classification Search
CPC . G06F 11/073; G06F 11/1004; G06F 11/1008
See application file for complete search history.

(56) References Cited

U.S. PATENT DOCUMENTS 6,011,908 A 1/2000 Wing et al.
8,521,949 B2 8/2013 Xiong
9,111,621 B2 8/2015 Krutzik
9,633,738 B1 4/2017 Guo
9,990,382 B1 6/2018 Dias
10,761,937 B2 9/2020 Lappi
(Continued)

FOREIGN PATENT DOCUMENTS

CN 105808394 A 7/2016
CN 106055424 A 10/2016
(Continued)

*Primary Examiner* — Philip Guyton
(74) *Attorney, Agent, or Firm* — Arlene P. Neal; NEAL BLIBO LLC

(57) ABSTRACT

A storage device ensures erasure of a first memory device even when the storage device is in an unrecoverable state. The storage device includes the first memory device and a controller. The controller executes operations on the first memory device in response to instructions received from a host coupled to the storage device. The controller may detect when an unrecoverable error occurs when executing instructions and enter an exception handling mode. The controller may also determine if the storage device enters an unrecoverable state and may move into a restricted firmware mode when the storage device enters the unrecoverable state. When in the restricted firmware mode, the controller may load firmware into a second memory device and, upon receiving a sanitize instruction from the host, the controller may execute the firmware in the second memory device to delete data in the first memory device.

20 Claims, 7 Drawing Sheets

(56) References Cited

U.S. PATENT DOCUMENTS

| | | | | |
|---|---|---|---|---|
| 2009/0300425 | A1* | 12/2009 | Gollub | G06F 11/0715 714/42 |
| 2010/0318810 | A1* | 12/2010 | Strom | G06F 21/80 713/190 |
| 2020/0097206 | A1* | 3/2020 | Aponte | G06F 16/162 |
| 2020/0150886 | A1* | 5/2020 | Farhan | G06F 21/78 |
| 2024/0320110 | A1* | 9/2024 | Mangal | G06F 11/1666 |

FOREIGN PATENT DOCUMENTS

| | | | |
|---|---|---|---|
| CN | 109471753 | A | 3/2019 |
| WO | 9415309 | A1 | 7/1994 |

* cited by examiner

SECURELY ERASING DATA ON INOPERATIVE STORAGE DEVICE

CROSS-REFERENCE TO RELATED APPLICATION

The present application claims the benefit of U.S. Provisional Application Ser. No. 63/454,423 titled "SECURELY ERASING DATA ON INOPERATIVE STORAGE DEVICE," filed Mar. 24, 2023, which is incorporated by reference herein in its entirety.

BACKGROUND

A storage device may include one or more memory devices with user data that may need to be erased, for example, when the memory devices and/or the storage device reach an end-of-life state. The memory devices may include both user data provided by a host and control data/metadata for control of operations on the storage device. Prior to disposing of the storage device, the host may issue a command to erase metadata and user data.

When the host determines, for example, that the storage device is nearing the end-of-life state, the host may issue a sanitize/secure erase command to erase the user data and metadata on the memory device. During the erasure of data, errors may occur when accessing the control data on the memory device and may result in the termination of the erasure operation before all user data is erased from the memory device. The storage device may utilize exception handling as one method to recover from such errors. In some cases, the exception handling may not be successful in recovering from such errors, and the storage device may become stuck in an unrecoverable state. A storage device in such an unrecoverable state may be termed a "bricked" device.

Of concern to a user when the storage device enters the unrecoverable state before all user data has been erased, is the user data remaining on the memory device. Even if the storage device/memory device is physically damaged, the user data may be recoverable. There is thus a need for a failsafe device and method to erase all data safely and reliably on a memory device even when the storage device is in an unrecoverable or bricked state.

SUMMARY

In some implementations, a storage device ensures the erasure of a first memory device coupled to the storage device. The first memory device may store user data and control data. A controller in the storage device may execute operations on the first memory device in response to instructions received from a host coupled to the storage device. The controller may detect when an unrecoverable error occurs when executing the instructions and enter an exception handling mode. The controller may also determine if the storage device enters an unrecoverable state and may move into a restricted firmware mode when the storage device enters the unrecoverable state. When in the restricted firmware mode, the controller may load firmware into a second memory device on the storage device, and upon receiving a sanitize instruction from the host, the controller may execute the firmware in the second memory device to delete data stored on the first memory device.

In some implementations, a method is provided for failsafe erasure of the first memory device. The method may include receiving, by the controller, instructions from the host to execute operations on the first memory device; executing the operations on the first memory device in response to the instructions received from the host; and determining if the storage device enters an unrecoverable state. The method may also include moving into a restricted firmware mode when the storage device enters the unrecoverable state; and when in the restricted firmware mode, loading firmware into a second memory device. Upon receiving a sanitize instruction from the host, the method includes executing the firmware in the second memory device to delete data in the first memory device.

In some implementations, a system is provided for failsafe erasure of a first memory device coupled to a storage device. The system includes a host and the storage device. The host may transmit instructions to store user data on the first memory device, read user data from the first memory device, and/or remove user data from the first memory device. The storage device may include a first memory device and a controller. The first memory device may store user data and control data. The controller may execute operations on the first memory device in response to instructions received from the host, detect when an unrecoverable error occurs when executing the instructions and enter an exception handling mode, determine if the storage device enters an unrecoverable state, and move into a restricted firmware mode when the storage device enters into the unrecoverable state. Wen in the restricted firmware mode, the controller may load firmware into a second memory device in the storage device, and upon receiving a sanitize instruction from the host, the controller may execute the firmware in the second memory device to delete data stored on the first memory device.

Figure 1:
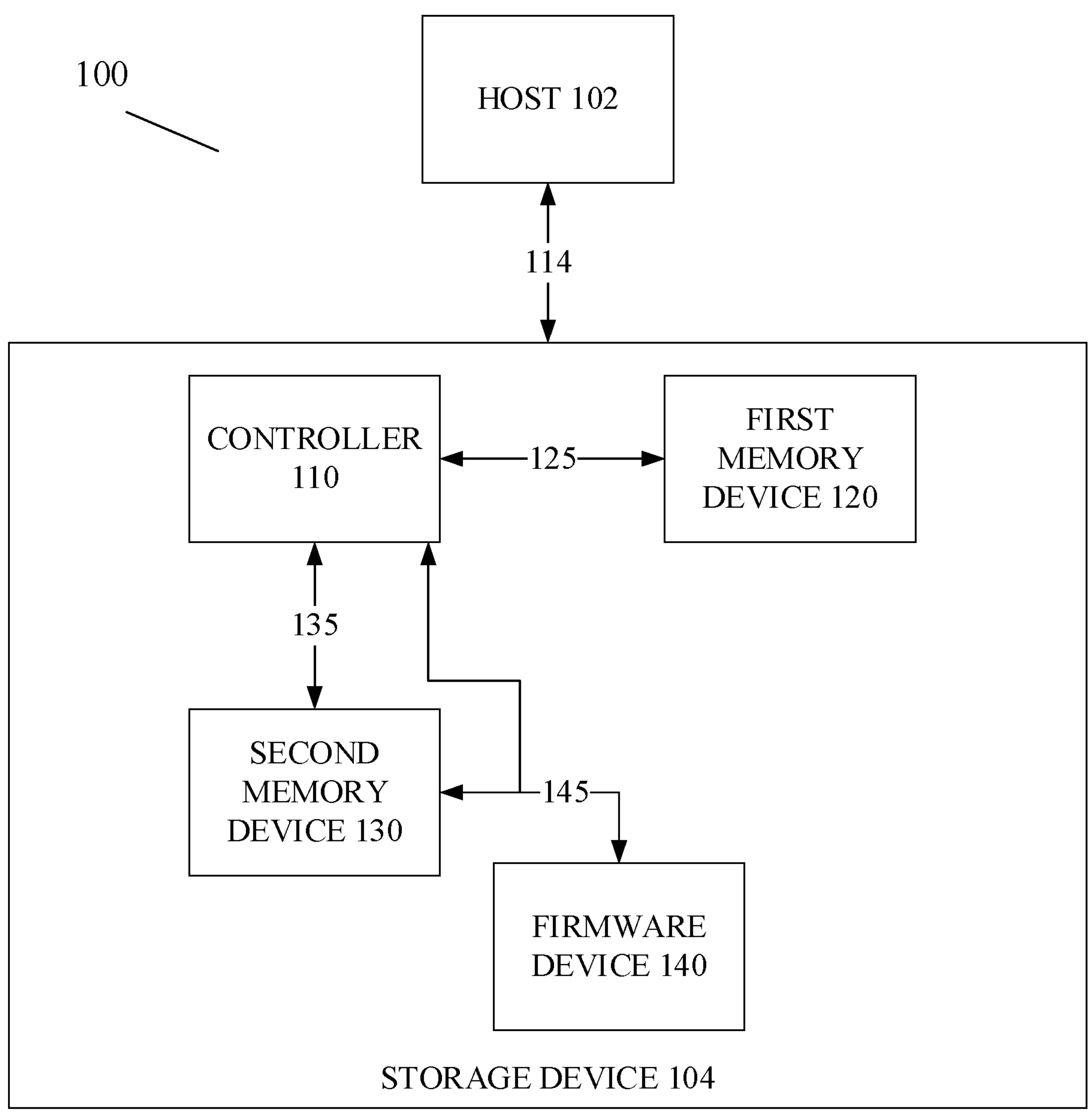
FIG. 1 is a schematic block diagram of an example device in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example device in accordance with some implementations. System 100 includes a host 102 and a storage device 104. Host 102 and storage device 104 may include one or more network interfaces to communicatively couple host 102 and storage device 104. For example, bus 114 may provide input to storage device 104 from host 102 and vice versa. Host 102 and storage device 104 may include one or more network interfaces to communicatively couple host 102 and storage device 104. For example, host 102 and storage device 104 may communicate via a peripheral component interconnect express (PCI Express or PCIe) with a Non-Volatile Memory Express (NVMe) interface, a Serial Advanced Technology Attachment (SATA) interface, a Parallel Advanced Technology Attachment (PATA) interface, a Small Computer System Interface (SCSI) interface, a Serially Attached SCSI (SAS) interface, a FireWire interface, a Fibre Channel connection interface, a Universal Serial Bus (USB) interface, a PCIe Advanced Switching (PCIe-AS) interface, or the like.

Host 102 and storage device 104 may be in the same physical location as components on a single computing device or on different computing devices that are communicatively coupled. Storage device 104, in various embodiments, may be disposed in one or more different locations relative to the host 102. System 100 may include additional components (not shown in this figure for the sake of simplicity).

Storage device 104 may include a controller 110 and one or more non-volatile memory devices 120 (referred to herein as a first memory device 120). Storage device 104 may be, for example, a solid-state drive (SSD), and the like. Controller 110 may interface with host 102 and process foreground operations including instructions transmitted from host 102. For example, controller 110 may read data from and/or write to first memory device 120 based on instructions received from host 102. Controller 110 may also execute background operations to manage resources on first memory device 120. For example, controller 110 may monitor first memory device 120 and may execute garbage collection and other relocation functions per internal relocation algorithms to refresh and/or relocate the data on first memory device 120.

First memory device 120 may be flash based, including, for example, NAND flash memory. First memory device 120 may be included in storage device 104 or may be otherwise communicatively coupled to storage device 104. Controller 110 may be coupled to first memory device 120 via a first memory bus 125, wherein controller 110 and first memory device 120 may communicate over first memory bus 125. First memory bus 125 may include one or more clock lines, one or more data lines, and one or more control lines. Controller 110 may execute storage functions in first memory device 120, wherein controller 110 may drive first memory bus 125 to read from and/or write to memory locations in first memory device 120.

Controller 110 may also be coupled to a second memory device 130 via a second memory bus 135, wherein controller 110 may communicate with second memory device 130 over second memory bus 135. Second memory bus 135 may include one or more clock lines, one or more data lines, and one or more control lines. Controller 110 may execute storage functions in second memory device 130, wherein controller 110 may drive second memory bus 135 to read from and/or write to memory locations in second memory device 130. Second memory device 130 may be, for example, random-access memory (RAM), read-only memory (ROM), and/or another type of dynamic or static storage device that stores information and/or instructions for use by controller 110. Second memory device 130 may store information and/or software related to the operation and use of components controlled by controller 110.

Controller 110 may also be coupled to a firmware device 140 and second memory device 130 via a third memory bus 145. Controller 110 may communicate with firmware device 140 over third memory bus 145. Third memory bus 145 may include one or more clock lines, one or more data lines, and one or more control lines. Controller 110 may drive third memory bus 145 to copy firmware instructions from firmware device 140 to locations in second memory 130. Firmware device 140 may be a one-time programmable device or a multiple-time programmable device. Firmware device 140 may be integrated on the same integrated circuit as controller 110 or in a separate integrated circuit.

In some implementations, controller 110 may receive a sanitize/secure erase command from host 102 to erase user data stored on first memory device 120. Host 102 may send the sanitize/secure erase command to storage device 104 when host 102 wants to erase the user data stored on first memory device 120. For example, host 102 may determine that storage device 104 is entering an end-of-life state and may send a sanitize/secure erase command to erase the user data stored on first memory device 120 before the user data becomes inaccessible to host 102. Host 102 may determine that storage device 104 is entering an end-of-life state if, for example, host 102 is unable to recognize storage device 104 while it is coupled to host 102. In response to receiving the sanitize/secure erase command, controller 110 may initiate one or more transactions, including reading control data from first memory device 120 and/or writing control data to first memory device 120.

If controller 110 can successfully read the control data from first memory device 120, controller 110 may update a control block in first memory device 120 and execute a control data write operation. If controller 110 can successfully write the control data to first memory device 120, controller 110 may delete host metadata and user data in one or more blocks in first memory device 120. Controller 110 may continue the read/write operations until all the user data in first memory device 120 is erased. Controller 110 may perform data integrity checks on the control data written to first memory device 120 and the control data read from first memory device 120. Data integrity checks may include a Cyclic Redundancy Check (CRC), a checksum, a hash function, a parity check, or another data integrity check.

If controller 110 detects an error during a control data read operation, controller 110 may enter an exception handling mode, wherein controller 110 may abort the sanitize/secure erase operation, suspend background operations, and enter a read-only mode. Controller 110 may initiate a reset sequence and a controller power down and up to reset controller 110 on every mount. Controller 110 may perform another read operation and if that is unsuccessful, controller 110 may reenter the exception handling mode.

If controller 110 detects an error during a control data write operation, controller 110 may retry multiple control data write operations, and if these fail, controller 110 may enter the exception handling mode, wherein controller 110 may abort the sanitize/secure erase operation, suspend background operations, and enter a read-only mode. Controller 110 may initiate a reset sequence and a controller power down and up to reset controller 110 on every mount. Controller 110 may perform another read operation and if that is unsuccessful, controller 110 may reenter the exception handling mode. By reentering the exception handling mode, storage device 104 may possibly enter a brick/unrecoverable state.

Controller 110 may include a counter circuit to count the number of reset sequences initiated by controller 110. Firmware device 140 may detect the number of times a controller reset operation is performed by storage device 104. If firmware device 140 determines that the controller reset operation has been performed a predefined number of times such that a value of the counter in the counter circuit reaches a predetermined threshold value, controller 110 may determine that storage device 104 is in an unrecoverable state and controller 110 may enter a restricted firmware mode. In the restricted firmware mode, controller 110 may issue instructions over third memory bus 145 to move data from firmware device 140 to second memory device 130. Data moved from firmware device 140 to second memory device 130 may include a restricted firmware block that may execute a limited number of operations. For example, the restricted firmware block may execute sanitize operations and may not execute read and/or write commands from host 102.

Controller 110 may inform host 102 that storage device 104 has entered the restricted firmware mode and may inform host 102 of the features supported by storage device 104 in the restricted firmware mode. For example, controller 110 may inform host 102 that sanitize/erase operations are supported in the restricted firmware mode. Host 102 may send a sanitize command to storage device 104 for controller 110 to continue to erase data on first memory device 120. Controller 110 may read the geometry of first memory device 120 to determine the capacity of first memory device 120. For example, controller 110 may determine the maximum number of blocks in the first memory device.

Controller 110 may execute the restricted firmware instructions in second memory device 130 to continue erasing the contents of first memory device 120. Using the restricted firmware in second memory device 130, controller 110 may erase the contents of first memory device 120, beginning at location zero and ending at the last block in first memory device 120. Controller 110 may thus erase user data and control data stored on first memory device 120. Controller 110 may indicate the completion of the erasure of first memory device 120 to host.

In some implementations, storage device 104 may receive read/write instructions from host 102 and due to the condition of storage device 104, controller 110 may be unable to execute the read/write instructions received from host 102. For example, when storage device 104 is near or at the end-of-life state, first memory device 120 may be damaged due to temperature, humidity, or other conditions that may cause the control data to become bad and/or inaccessible. If controller 110 is unable to recover during execution of the read/write operations and enters a brick state, controller 110 may enter the exception handling mode. Firmware device 140 may detect the number of times the controller reset operation is performed by storage device 104. If firmware device 140 determines that the controller reset operation has been performed a predefined number of times such that a value of the counter in the counter circuit reaches the predetermined threshold value, controller 110 may enter the restricted firmware mode and controller 110 may move the restricted firmware block of instructions from firmware device 140 to second memory device 130.

Controller 110 may inform host 102 that storage device 104 has entered the restricted firmware mode and may inform host 102 of the features supported by storage device 104 in the restricted firmware mode. Host 102 may send a sanitize command to storage device 104 for controller 110 to erase data on first memory device 120. Controller 110 may read the geometry of first memory device 120 to determine the capacity of first memory device 120. Controller 110 may execute instructions within the restricted firmware block in second memory device 130 to erase the contents of first memory device 120, beginning at location zero and ending at the last block in first memory device 120. Controller 110 may indicate the completion of the erasure of first memory device 120 to host 102.

Storage device 104 may perform these processes based on a processor, for example, controller 110 executing software instructions stored by a non-transitory computer-readable medium. As used herein, the term "computer-readable medium" refers to a non-transitory memory device. Software instructions may be read into the memory device from another computer-readable medium or from another device. When executed, software instructions stored in the memory device may cause controller 110 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 1 are provided as an example. In practice, host 102 and/or storage device 104 may include additional components, fewer components, different components, or differently arranged components than those shown in FIG. 1. Additionally, or alternatively, a set of components (e.g., one or more components) of host 102 and/or storage device 104 may perform one or more functions described as being performed by another set of components of host 102 and/or storage device 104.

Figure 2A:
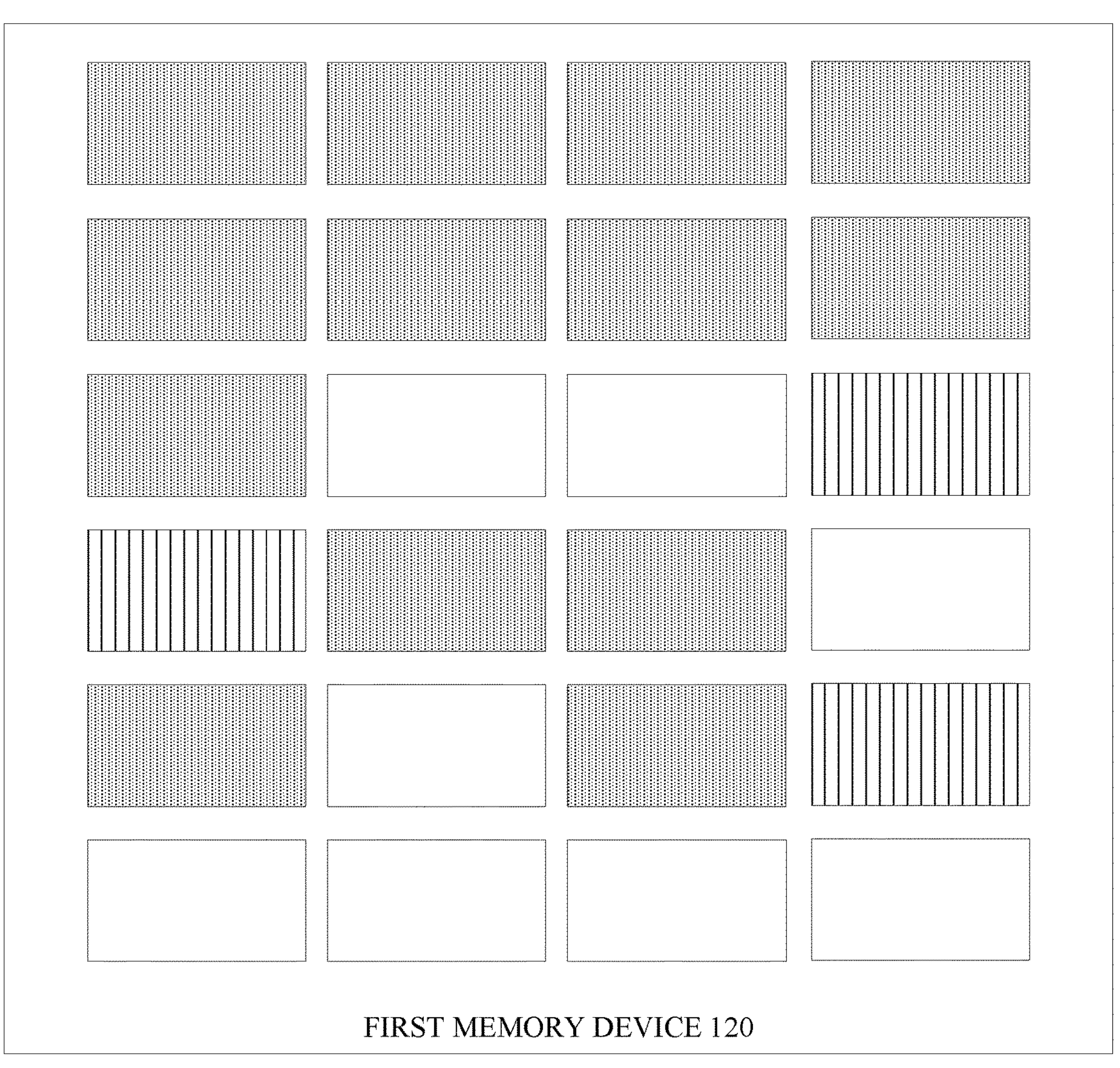
FIGS. 2A-2D are schematic block diagrams of an example memory device in accordance with some implementations.

FIGS. 2A-2D are schematic block diagrams of an example memory device in accordance with some implementations. FIG. 2A shows an example of first memory device 120 including user data and control data. The user data may be data provided by host 102 and the control data may be data used by controller 110 to control background operations and to execute read/write instructions, sanitize/erase commands, or other instructions received from host 102. First memory device 120 may include twenty-four blocks, with the shaded blocks representing locations in first memory device 120 that include user data. The blocks with control data are shown with vertical lines. The blocks without data are shown with no lines or patterns.

Figure 2B:
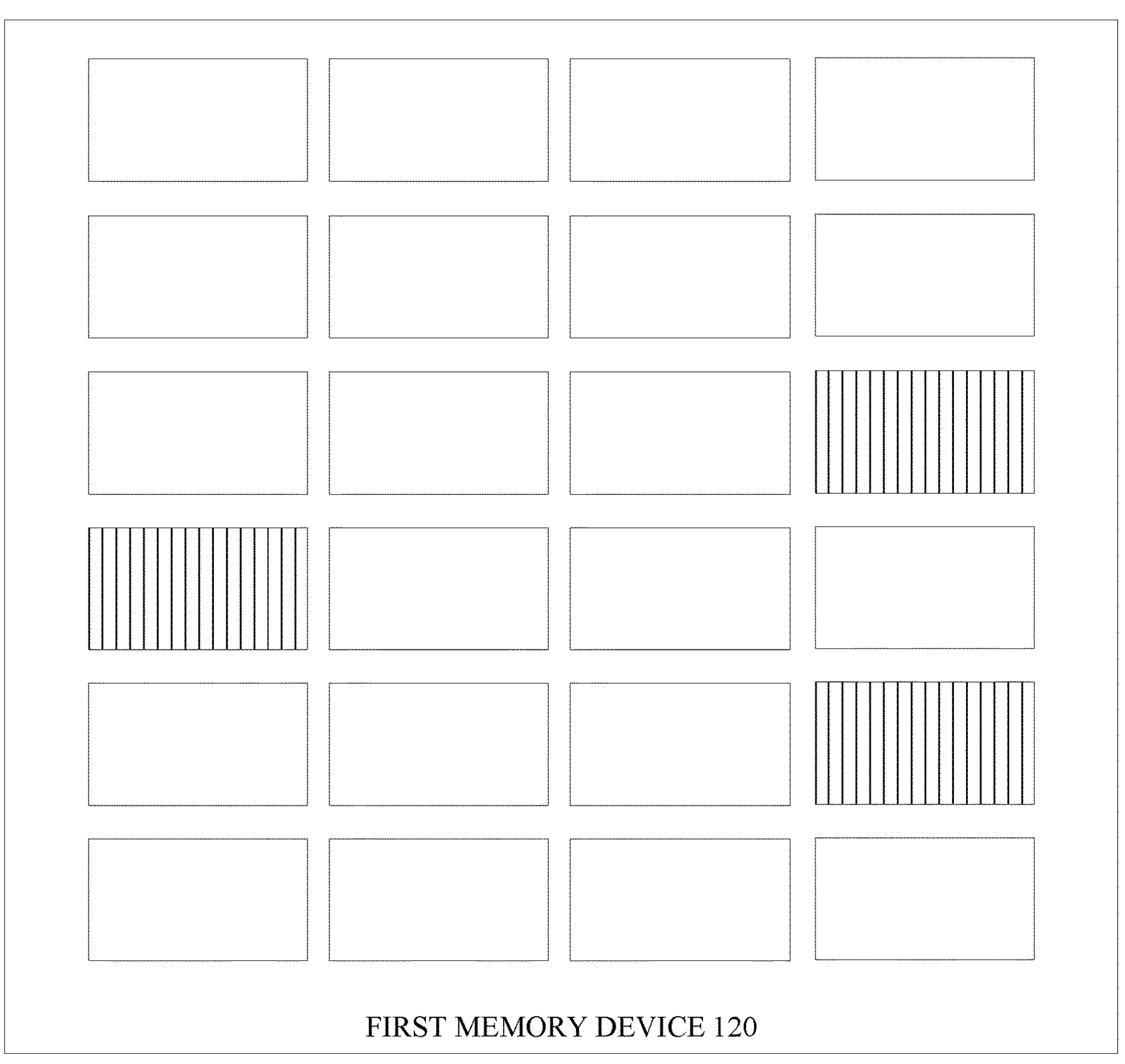

When controller 110 receives a sanitize/secure erase command from host 102, controller 110 may read control data from and write control data to first memory device 120. If the control data read and write operations are successful, controller 110 may update the control data in first memory device 120 and may delete the user data in first memory device 120, as shown in FIG. 2B.

Figure 2C:
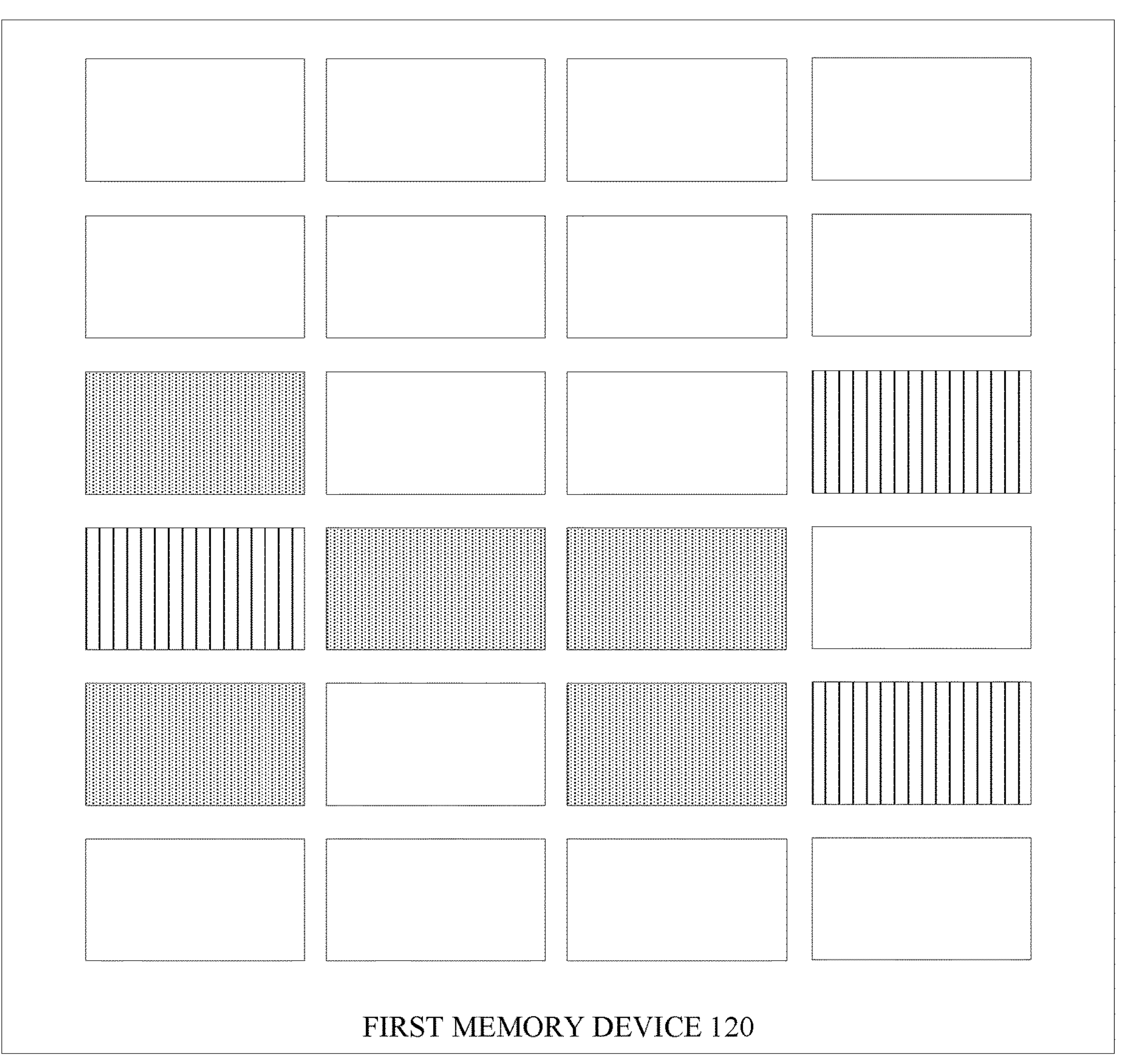
Figure 2D:
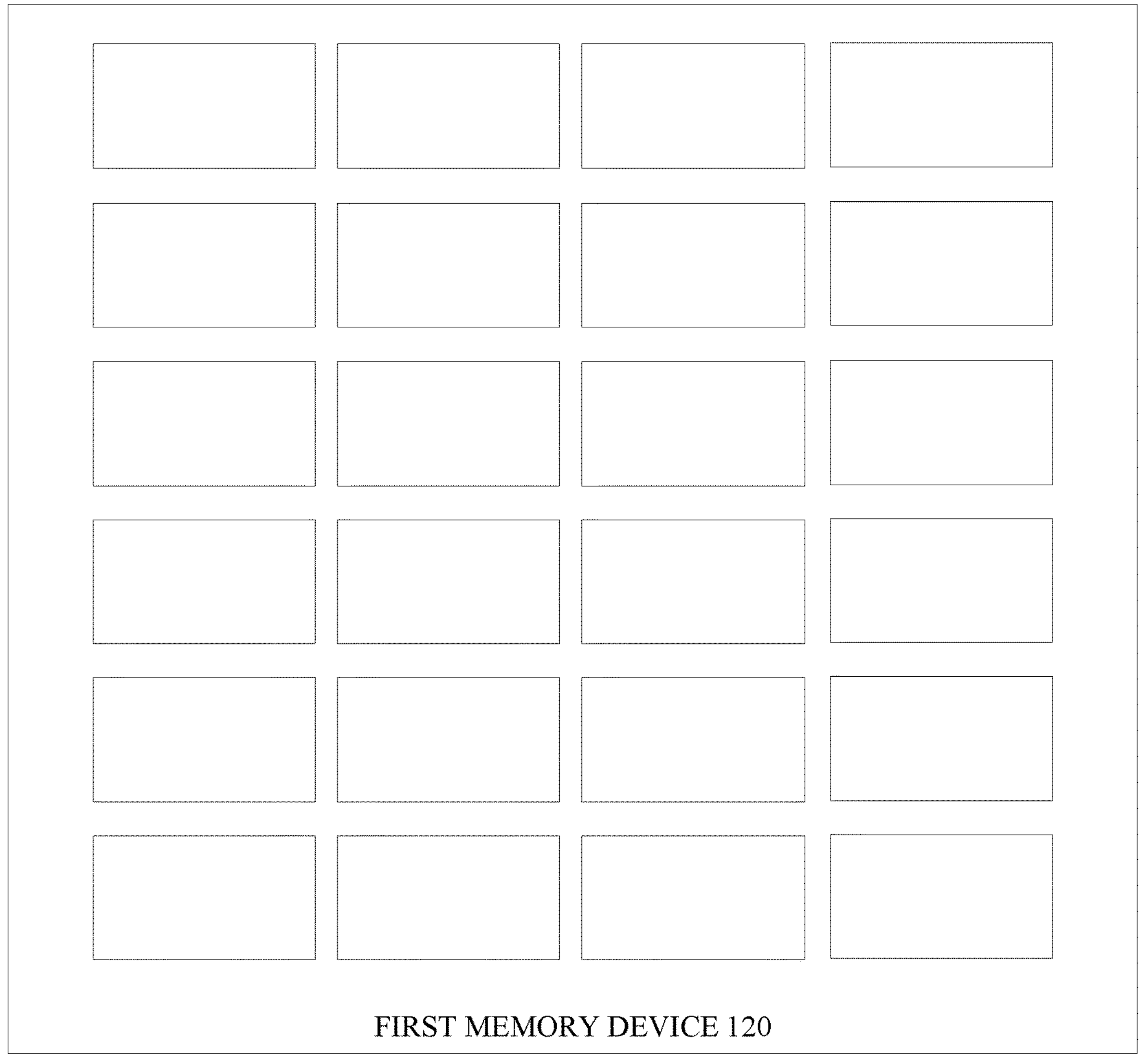

FIG. 2C shows an example where in the process of deleting user data from first memory device 120, the control data read and/or write operations fail. In this case, some user data will still need to be erased. To ensure that all of the user data is removed, controller 110 may move to an exception handling state and suspend background operations. Controller 110 may issue a reset command to power down and restart controller 110. When controller 110 is restarted, it may execute control data read/write operations, and if these operations are again unsuccessful, controller 110 may issue another reset command. After controller 110 issues a predefined number of reset commands, controller 110 may load restricted firmware in second memory device 130. The restricted firmware may support a limited number of operations, including, for example, sanitize/secure erase operations. When the restricted firmware is loaded in second memory device 130, controller 110 may not execute read/write operations. Controller 110 may jump to the restricted firmware in second memory device 130 and may notify host 102 of the operations supported by the restricted firmware. Host 102 may transmit a sanitize command to controller 110. When controller 110 receives the sanitize command, controller 110 may read the geometry of first memory device 120 to determine the maximum number of blocks in first memory device 120. Starting at block zero and ending at the maximum number of blocks in first memory device 120, controller 110 may erase data in each block in first memory device 120, as shown in FIG. 2D. As indicated above FIGS. 2A-2D are provided as examples. Other examples may differ from what is described in FIGS. 2A-2D.

Figure 3:
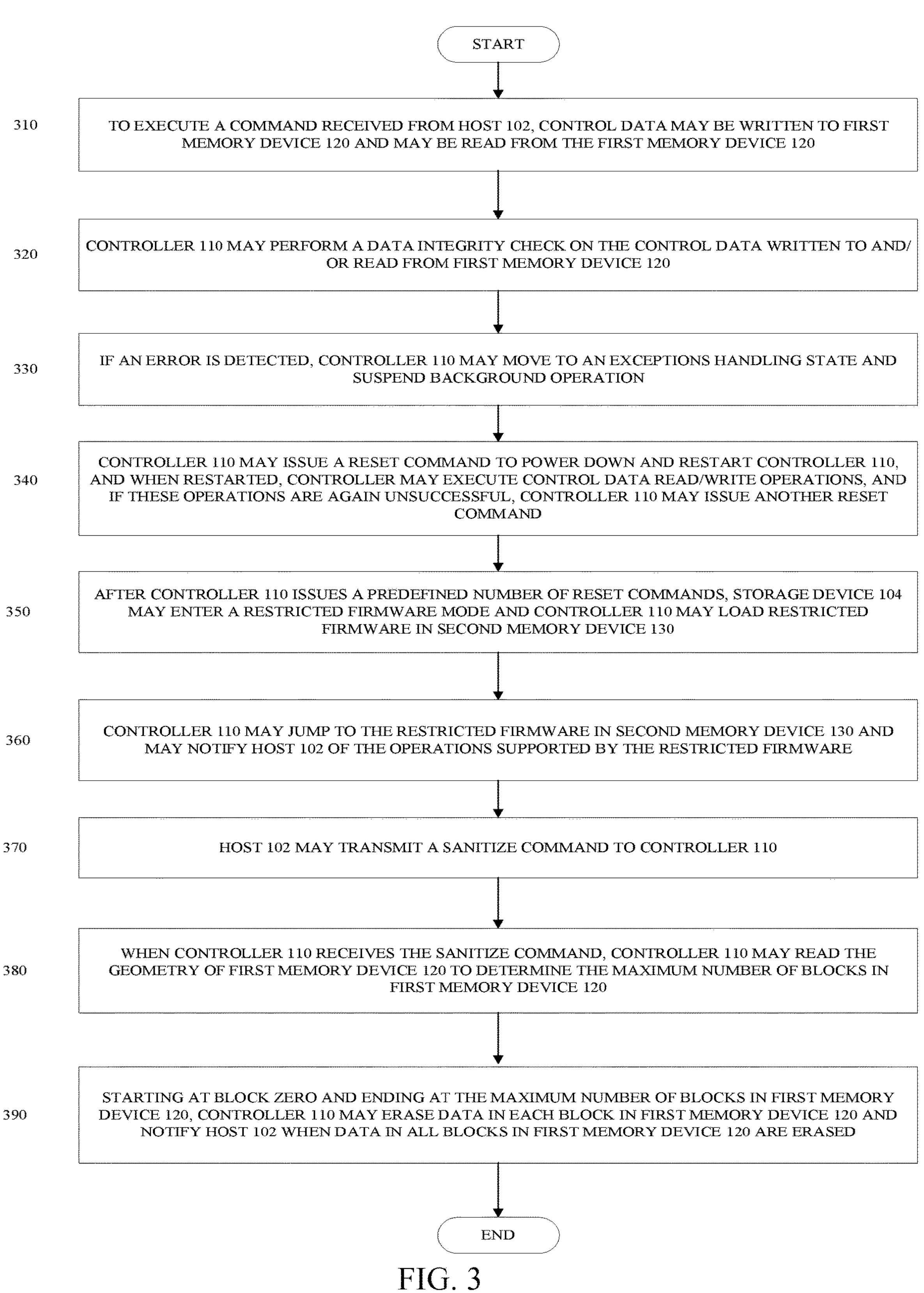
FIG. 3 is a flow diagram of an example process for failsafe erasure of a storage device in accordance with some implementations.

FIG. 3 is a flow diagram of an example process for failsafe erasure of a storage device. At 310, to execute a command received from host 102, control data may be written to first memory device 120 and may be read from the first memory device 120. The control data written to and read from the first memory device may be part of a process to erase the contents of first memory device 120. At 320, controller 110 may perform a data integrity check on the control data written to and/or read from first memory device 120.

If an error is detected, at 330, controller 110 may move to an exception handling state and suspend background operation. At 340, controller 110 may issue a reset command to power down and restart controller 110, and when restarted, controller may execute control data read/write operations, and if these operations are again unsuccessful, controller 110 may issue another reset command. At 350, after controller 110 issues a predefined number of reset commands, storage device may enter a restricted firmware mode and controller 110 may load restricted firmware in second memory device 130. At 360, controller 110 may jump to the restricted firmware in second memory device 130 and may notify host 102 of the operations supported by the restricted firmware. At 370, host 102 may transmit a sanitize command to controller 110. At 380, when controller 110 receives the sanitize command, controller 110 may read the geometry of first memory device 120 to determine the maximum number of blocks in first memory device 120. At 390, starting at block zero and ending at the maximum number of blocks in first memory device 120, controller 110 may erase data in each block in first memory device 120 and notify host 102 when data in all blocks in first memory device 120 are erased. FIG. 3 is provided as an example. Other examples may differ from what is described in FIG. 3.

Figure 4:
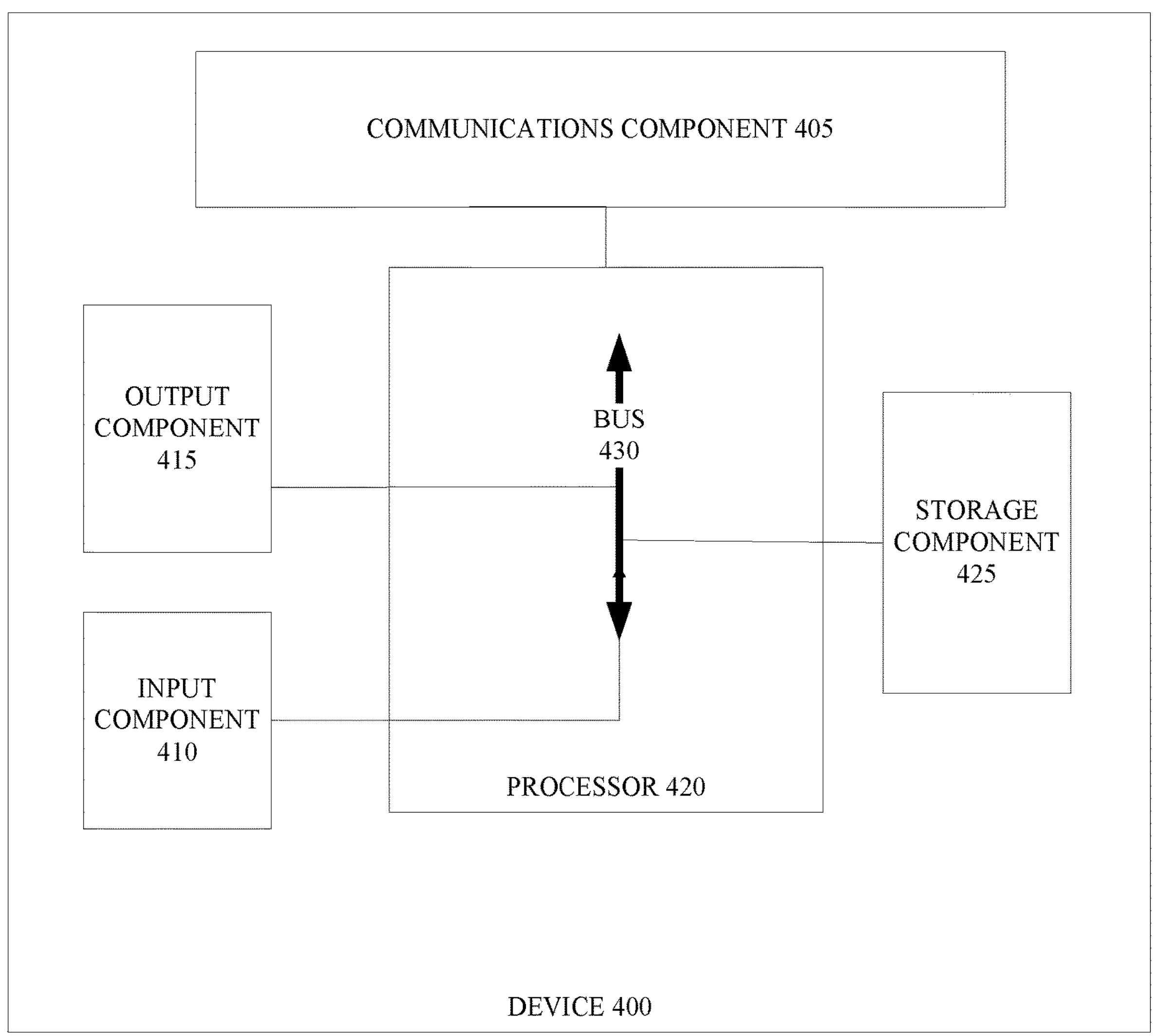
FIG. 4 is a diagram of example components of one or more devices of FIG. 1.

FIG. 4 is a diagram of example components of one or more devices of FIG. 1. In some implementations, host 102 may include one or more devices 400 and/or one or more components of device 400. Device 400 may include, for example, a communications component 405, an input component 410, an output component 415, a processor 420, a storage component 425, and a bus 430. Bus 430 may include components that enable communication among multiple components of device 400, wherein components of device 400 may be coupled to be in communication with other components of device 400 via bus 430.

Input component 410 may include components that permit device 400 to receive information via user input (e.g., keypad, a keyboard, a mouse, a pointing device, a microphone, and/or a display screen), and/or components that permit device 400 to determine the location or other sensor information (e.g., an accelerometer, a gyroscope, an actuator, another type of positional or environmental sensor). Output component 415 may include components that provide output information from device 400 (e.g., a speaker, display screen, and/or the like). Input component 410 and output component 415 may also be coupled to be in communication with processor 420.

Processor 420 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 may include one or more processors capable of being programmed to perform a function. Processor 420 may be implemented in hardware, firmware, and/or a combination of hardware and software.

Storage component 425 may include one or more memory devices, read-only memory (ROM), and/or another type of dynamic or static storage device (e.g., a flash memory, a magnetic memory, and/or optical memory) that stores information and/or instructions for use by processor 420. A memory device may include memory space within a single physical storage device or memory space spread across multiple physical storage devices. Storage component 425 may also store information and/or software related to the operation and use of device 400. For example, storage component 425 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 405 may include a transceiver-like component that enables device 400 to communicate with other devices, such as via a wired connection, a wireless connection, or a combination of wired and wireless connections. The communications component 405 may permit device 400 to receive information from another device and/or provide information to another device. For example, communications component 405 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 405 may also include one or more broadband and/or narrowband transceivers and/or other similar types of wireless transceiver configurable to communicate via a wireless network for infrastructure communications. Communications component 405 may also include one or more local area network or personal area network transceivers, such as a Wi-Fi transceiver or a Bluetooth transceiver.

Device 400 may perform one or more processes described herein. For example, device 400 may perform these processes based on processor 420 executing software instructions stored by a non-transitory computer-readable medium, such as storage component 425. As used herein, the term "computer-readable medium" refers to a non-transitory memory device. Software instructions may be read into storage component 425 from another computer-readable medium or from another device via communications component 405. When executed, software instructions stored in storage component 425 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to ensure erasure of a first memory device coupled to the storage device even when the storage device is in an unrecoverable state, the storage device comprising:

a first memory device to store user data and control data; and a controller to:

execute erase operations on the first memory device in response to sanitize instructions received from a host, detect that an unrecoverable error occurs when executing the sanitize instructions, abort the erase operations, and enter an exception handling mode, determine that the storage device has entered an unrecoverable state, and move into a restricted firmware mode when the storage device enters into the unrecoverable state, wherein when in the restricted firmware mode, the controller loads firmware into a second memory device in the storage device, informs the host that the storage device has entered in the restricted firmware mode and that the storage device supports a sanitize operation in the restricted firmware mode, waits to receive a sanitize instruction from the host, and upon receiving the sanitize instruction from the host, the controller executes the firmware in the second memory device to resume the erase operations and delete the user data and the control data stored on the first memory device.

2. The storage device of claim 1, wherein the controller reads control data from the first memory device and writes control data to the first memory device when executing operations on the first memory device.

3. The storage device of claim 1, wherein the sanitize instructions include an erase command sent from the host.

4. The storage device of claim 1, wherein in the exception handling mode, the controller aborts execution of the erase operations, suspends background operations, enters a read-only mode, and initiates a reset sequence.

5. The storage device of claim 1, further comprising a counter circuit to count reset sequences initiated by the controller.

6. The storage device of claim 1, further comprising a firmware device to store the firmware before it is moved into the second memory device and to determine when a count of reset sequences reaches a predetermined threshold value, wherein the controller moves into the restricted firmware mode when the count of reset sequences reaches the predetermined threshold value.

7. The storage device of claim 1, wherein when in the restricted firmware mode, the controller informs the host of features supported in the restricted firmware mode and the controller executes a limited number of operations in the restricted firmware mode.

8. The storage device of claim 1, wherein in executing the firmware in the second memory device, the controller reads a geometry of the first memory device to determine a capacity of the first memory device and executes the firmware to erase contents of the first memory device, starting at location zero in the first memory device and ending at the last block in the first memory device.

9. The storage device of claim 1, wherein the controller sends a completion indication to the host when the first memory device is deleted.

10. A method for failsafe erasure of a first memory device coupled to a storage device, the storage device comprises a controller to execute operations on the storage device, the method comprising:

receiving, by the controller, sanitize instructions from a host coupled to the storage device to execute erase operations on the first memory device;

executing, by the controller, the erase operations on the first memory device in response to the sanitize instructions received from the host;

detecting that an unrecoverable error occurs when executing the sanitize instructions, aborting the erase operations, and entering an exception handling, determining, by the controller, that the storage device has entered an unrecoverable state;

moving, by the controller, into a restricted firmware mode when the storage device enters into the unrecoverable state;

when in the restricted firmware mode, loading, by the controller, firmware into a second memory device in the storage device;

informing the host, by the controller, that the storage device has entered in the restricted firmware mode and that the storage device supports the erase operations in the restricted firmware mode;

waiting to receive a sanitize instruction from the host; and upon receiving the sanitize instruction from the host, executing, by the controller, the firmware in the second memory device to resume the erase operations and delete user data and control data in the first memory device.

11. The method of claim 10, wherein in executing the operations on the first memory device, the method further comprises detecting, by the controller, when an unrecoverable error occurs when executing the instructions and entering an exception handling mode.

12. The method of claim 11, wherein in the exception handling mode, the method further comprises aborting execution of the operations, suspending background operations, entering a read-only mode, and initiating a reset sequence.

13. The method of claim 12, further comprising counting reset sequences initiated by the controller.

14. The method of claim 10, further comprising determining when a count of reset sequences reaches a predetermined threshold value and moving into the restricted firmware mode when the count of reset sequences reaches the predetermined threshold value.

15. The method of claim 10, further comprising, in the restricted firmware mode, informing the host of features supported in the restricted firmware mode and executing a limited number of operations in the restricted firmware mode.

16. The method of claim 10, wherein executing the firmware in the second memory device, comprises reading a geometry of the first memory device to determine a capacity of the first memory device and executing the firmware to erase contents of the first memory device, starting at location zero in the first memory device and ending at the last block in the first memory device.

17. The method of claim 10, further comprising sending a completion indication to the host when the first memory device is deleted.

18. A system for failsafe erasure of a first memory device coupled to a storage device, the system comprises:

a host to transmit instructions to one of store user data on the first memory device, read user data from the first memory device, and remove user data from the first memory device; and a storage device including the first memory device to store user data and control data and a controller, wherein the controller executes erase operations on the first memory device in response to sanitize instructions received from the host, detects that an unrecoverable error occurs when executing the sanitize instructions and aborts the erase operations and enter an exception handling mode, determines that the storage device enters an unrecoverable state, and moves into a restricted firmware mode when the storage device enters into the unrecoverable state, and wherein when in the restricted firmware mode, the controller loads firmware into a second memory device in the storage device, informs the host that the storage device has entered in the restricted firmware mode and that the storage device supports an erase operation in the restricted firmware mode, waits to receive a sanitize instruction from the host, and upon receiving the sanitize instruction from the host, the controller executes the firmware in the second memory device to resume the erase operations and delete the user data and the control data stored on the first memory device.

19. The system of claim 18, wherein when in the restricted firmware mode, the controller informs the host of features supported in the restricted firmware mode and the controller executes a limited number of operations in the restricted firmware mode.

20. The system of claim 18, wherein the controller sends a completion indication to the host when the first memory device is deleted.

* * * * *